United States Patent [19]

Nakase et al.

[11] Patent Number: 5,067,448
[45] Date of Patent: Nov. 26, 1991

[54] EXHAUST COOLING DEVICE FOR SMALL SIZED BOAT ENGINE

[75] Inventors: Ryoichi Nakase; Shigeharu Mineo, both of Hamamatsu, Japan

[73] Assignee: Sanshin Industries Co., Ltd., Hamamatsu, Japan

[21] Appl. No.: 412,850

[22] Filed: Sep. 26, 1989

[30] Foreign Application Priority Data

Sep. 27, 1988 [JP] Japan ................................ 63-241645

[51] Int. Cl.⁵ ................................................ F01P 1/06
[52] U.S. Cl. .................................... 123/41.31; 60/310; 60/320
[58] Field of Search ............... 123/41.31, 41.14; 60/320, 321, 912, 310, 317; 165/51, 71; 440/89

[56] References Cited

U.S. PATENT DOCUMENTS

| | | | |
|---|---|---|---|
| 799,013 | 9/1905 | Moffitt | 60/310 |
| 1,936,698 | 11/1933 | Vincent | 60/321 |
| 2,906,509 | 9/1959 | Wateren | 165/143 |
| 2,935,039 | 5/1960 | Thompson | 60/310 |
| 3,485,040 | 12/1969 | Niskanen | 60/310 |
| 3,765,479 | 10/1973 | Fish | 60/310 |
| 3,798,904 | 3/1974 | Gleason et al. | 60/320 |
| 3,802,491 | 4/1974 | Plank, Jr. et al. | 60/320 |
| 3,921,398 | 11/1975 | Kashmerick | 60/310 |
| 4,693,079 | 9/1987 | Wuensche et al. | 60/320 |

FOREIGN PATENT DOCUMENTS 104711 6/1985 Japan ..................... 60/320

*Primary Examiner*—Noah P. Kamen
*Attorney, Agent, or Firm*—Ernest A. Beutler

[57] ABSTRACT

A small watercraft embodying an improved exhaust system that is substantially completely watercooled by a cooling jacket. The exhaust system includes an elastic joint that is also completely surrounded by the cooling jacket so as to insure adequate cooling under all running conditions. A damming arrangement is incorporated so as to insure that all of the exhaust portions being cooled will be completely encircled with cooling water even when low amounts of water are being circulated and a drain system is also provided so as to insure that the cooling jackets will be drained when the watercraft is removed from a body of water.

4 Claims, 4 Drawing Sheets 5,067,448

EXHAUST COOLING DEVICE FOR SMALL SIZED BOAT ENGINE

BACKGROUND OF THE INVENTION

This invention relates to an exhaust cooling device for small sized boat engines and more particularly to an improved arrangement for cooling the exhaust system of an internal combustion engine.

It is well known that the exhaust system of an internal combustion engine generates a large amount of heat. For this reason, it is the practice in many applications, to cool the exhaust system and particularly the exhaust pipes through which the exhaust gases pass. Doing so is particularly important in marine applications and various arrangements have been proposed for cooling the exhaust gases in such applications. Most of the cooling systems for marine exhausts utilize the cooling water from the engine which is returned to the body of water in which the watercraft is operated. Frequently, the cooling water is discharged into the exhaust system so as to assist in cooling the exhaust. This is particularly important in connection with watercraft since they frequently use elastic joints in the exhaust system so as to reduce vibration. If the exhaust joints are not adequately cooled, the elastic material may deteriorate and eventually fail.

Another way in which the exhaust system or components are cooled is by forming a cooling jacket around portions of the exhaust pipe. This cooling jacket is supplied with coolant from the engine cooling jacket and this water is then discharged back into the body of water in which the watercraft is operating. Although this method of cooling the exhaust pipes is very helpful, when the engine is running at low speeds there is very little coolant flow through the engine cooling jacket. As a result, the cooling jacket encircling the exhaust pipe may not be fully filled with coolant and, in fact, under extreme cases the coolant may not even touch the exhaust pipe. As a result, overheating can occur.

It is, therefore, a principle object of this invention to provide an improved cooling arrangement for an exhaust pipe for an internal combustion engine.

It is a further object of this invention to provide the cooling arrangement for an exhaust pipe wherein it is insured that the exhaust pipe is encircled with coolant at all times when the engine is running.

It is a further object of this invention to provide an improved cooling system for the exhaust of a small watercraft.

SUMMARY OF THE INVENTION

This invention is adapted to be embodied in a cooling arrangement for an exhaust pipe or the like and comprises a cooling jacket that is formed around the exhaust pipe. A coolant inlet is provided to the cooling jacket and a coolant outlet is provided for the cooling jacket which outlet is positioned above the coolant inlet to insure that the volume of the cooling jacket between the inlet and the outlet is filled with coolant so as to insure adequate cooling of the exhaust pipe.

DETAILED DESCRIPTION OF THE PREFERRED EMBODIMENT OF THE INVENTION

Figure 1:
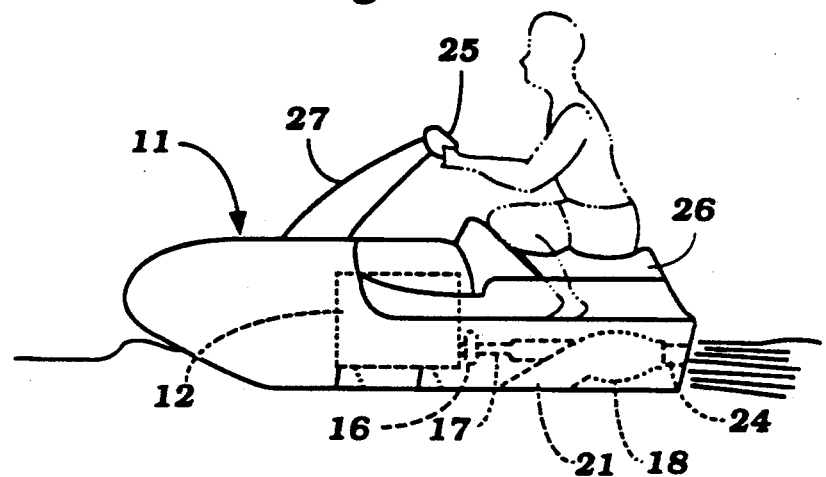
FIG. 1 is a side elevational view of a small watercraft constructed in accordance with an embodiment of the invention.
Figure 2:
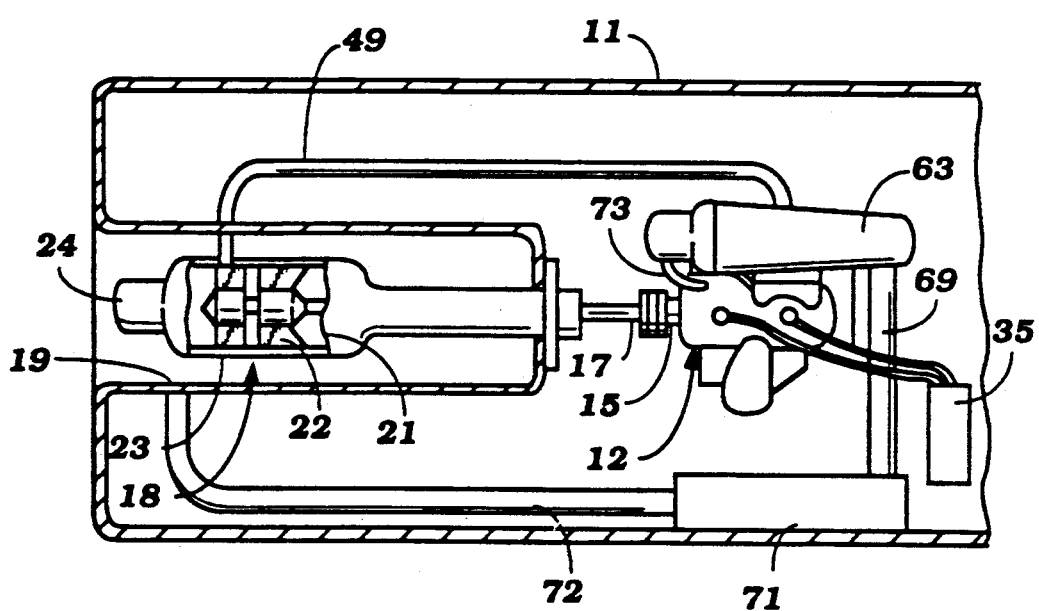
FIG. 2 is a top plan view, with portions broken away and other portion shown in section, of the drive arrangement for the small watercraft.
Figure 3:
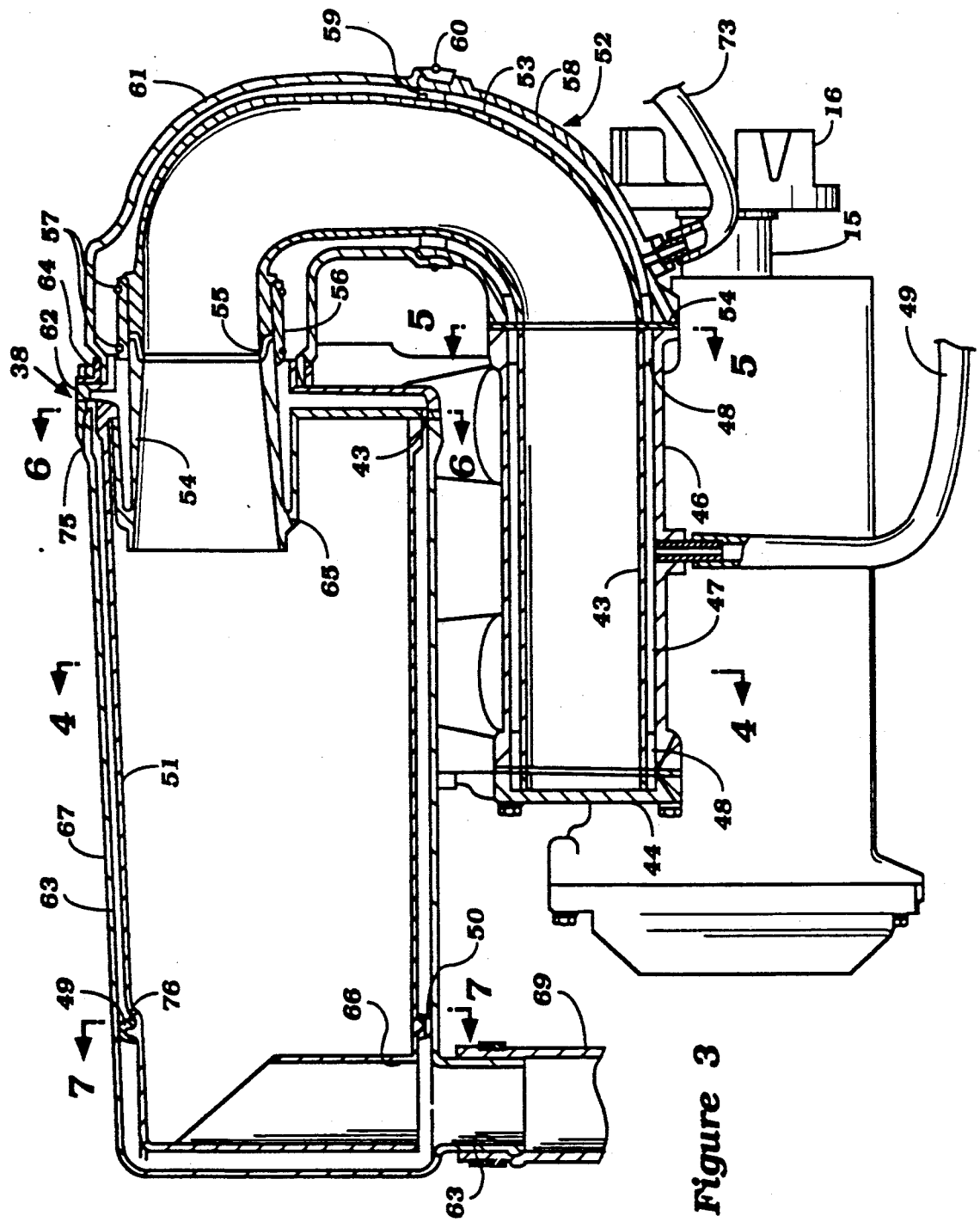
FIG. 3 is an enlarged cross sectional view taken through the exhaust system of the engine generally along the line 3—3 of FIG. 4.

Referring first to FIGS. 1 and 2, a small watercraft is indicated generally by the reference numeral 11 and is depicted as a typical environment in which the invention may be employed. The small watercraft 11 is provided with an engine compartment in which an internal combustion engine 12 is positioned. Although the invention is capable of use with a wide variety of types of engines, in the illustrated embodiment, the engine 12 of the two cylinder in-line type and operates on the two-stroke crankcase compress principle.

Figure 4:
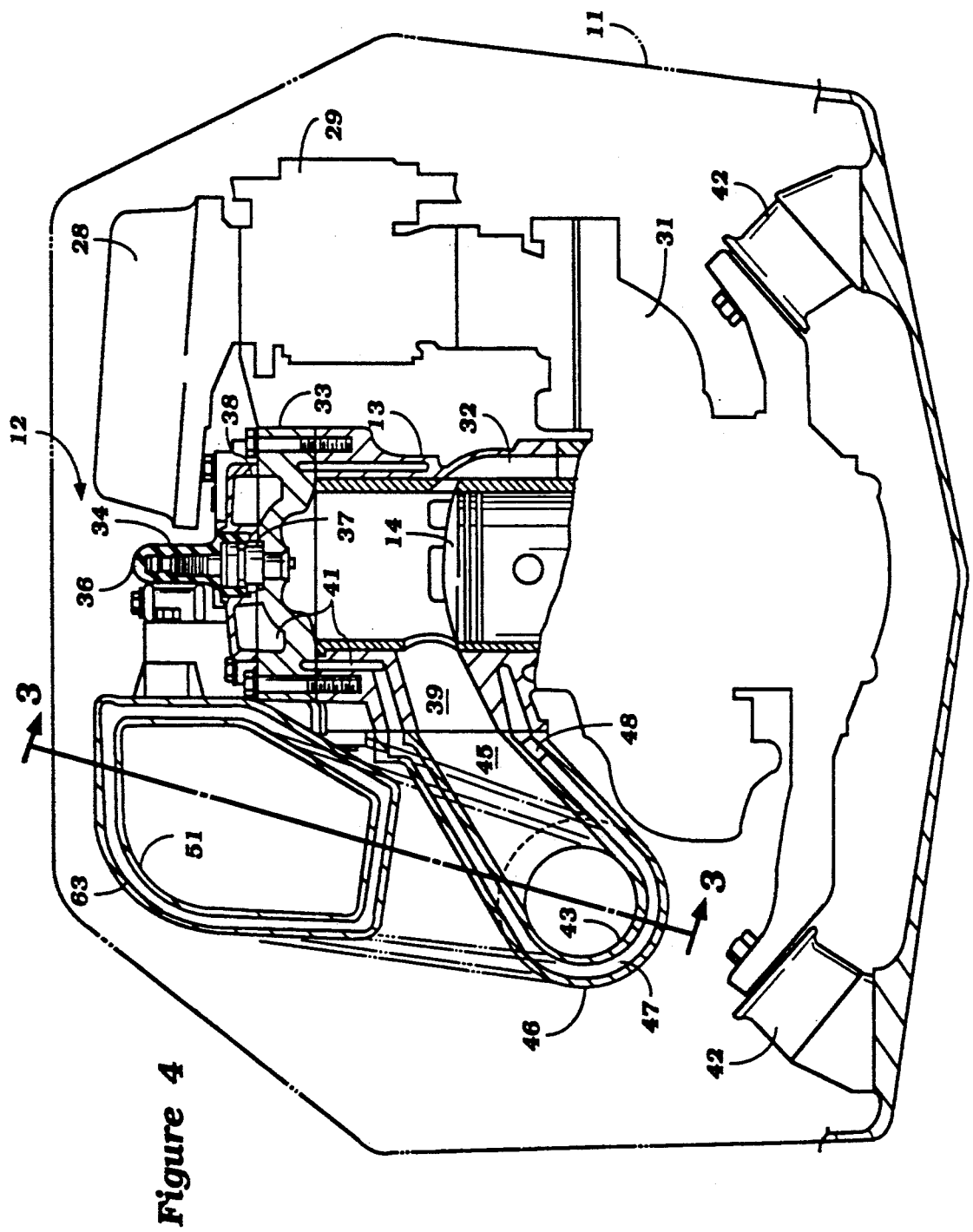
FIG. 4 is a cross sectional view taken generally along the line 4—4 of FIG. 3 and shows the engine and its exhaust system.

As may be seen in FIG. 4, the engine 12 is comprised of a cylinder block 13 in which a pair of cylinder bores (only one of which appears in this figure) are formed. Pistons 14 reciprocate in these cylinder bores and are connected by means of connecting rods (not shown) to a crankshaft 15 of the engine. The crankshaft 15 is coupled by means of a coupling 16 to a driveshaft 17 of a jet propulsion unit indicated generally by the reference numeral 18.

The jet propulsion unit 18 is positioned within a recess or tunnel 19 formed centrally and at the rear of the hull of the watercraft 11. The jet propulsion unit 19 includes a downwardly facing water inlet 21 into which water is drawn by an impeller 22 and is discharged past straightening vanes 23. The water is then discharged through a steering nozzle 24 that is steered by means of a handlebar assembly 25 positioned immediately forward of a rider's seat 26 on a mast 27. A rider, shown in FIG. 1, is adapted to sit upon the seat 26 in a straddle fashion for operating the watercraft in a well known manner.

Referring again to FIG. 4, the engine 12 is provided with an induction system that includes an air intake device 28 which delivers air to one or more carburetors 29. The carburetors 29 in turn deliver a fuel air charge to the crankcase chambers of the engine through an intake manifold 31. This charge is then transferred to the combustion chamber through respective scavenge passages 32, as is well known in this art.

A cylinder head 33 is affixed to the cylinder block 13 in a known manner and mounts individual spark plugs 34 for each of the cylinders of the engine. The spark plugs 34 are fired by means of a suitable ignition system depicted schematically in FIG. 2 at 35.

It should be noted that the spark plugs 34 are provided with combined terminals and protective boots 36 which encircle the exposed portion of the spark plug 34 and which have a skirt portion 37 that extends into a recess in a cylinder head cover 38 so as to provide a good water tight seal.

The exhaust gases from the individual combustion chambers are discharged through respective exhaust ports 39 that extend through the side of the cylinder block 13 and which cooperate with an exhaust manifold and exhaust system of a type to be described.

The engine 12 is also provided with a liquid cooling system that includes a cooling jacket 41 that encircles the components of the engine to be cooled and which is formed in the cylinder block 13 and cylinder head 33. Coolant is drawn for the engine cooling system from the body of water in which the watercraft is operating in a suitable manner and discharged in a manner which will be described.

The engine 12 is mounted within the hull of the watercraft by means of a plurality of resilient engine mounts 42 (FIG. 4).

The exhaust system for the engine will now be described by primary reference to the remaining figures, (3 through 7) although the exhaust system is also shown partially schematically in FIG. 2. There is provided an exhaust manifold that is comprised of a generally cylindrical expansion chamber portion 43 that runs longitudinally along one side of the engine and which is closed at one end by ends of a cover plate 44. The expansion chamber 43 communicates with the individual exhaust ports 39 of the cylinder block 33 through respective runner portions 45.

The cylindrical portion 43 is further enclosed by means of a cylindrical outer member 46 which defines a jacket or cooling chamber 47 around the periphery of the manifold portion 43 and also around the individual runners 45. Coolant is delivered to the cooling jacket 47 from the jet propulsion unit 18 through a flexible conduit 49. The coolant delivered to the cooling jacket 47 is then transferred through restricted ports 48 to the cooling jacket 41 of the engine 12. The size of the ports 48 will determine how much water is delivered from the cooling jacket 47 to the engine cooling jacket 41.

The first expansion chamber formed by the manifold portion 43 communicates with a second expansion chamber, indicated by the reference numeral 51 through a U-shaped connecting joint 52 constructed in accordance with an embodiment of the invention. This U-shaped connecting joint 52 includes a first inner U-shaped tube 53 that communicates at its inlet end with the expansion chamber 43 of the manifold with an interposed gasket 54 so as to provide sealing and also so as to permit some flexibility in the connection. The first inner tube 53 is connected to a megaphone tube 54 that extends into the expansion chamber 51 by means of a slip joint 55. There is a slight air gap between the ends of the inner pipe 53 and the megaphone tube 54 which forms a second inner pipe. An elastic interconnecting joint 56 encircles this slip joint and is held in place by means of a pair of hose clamps 57. As a result, some flexibility will be allowed between the inner pipe 53 and the megaphone tube 54 so as to permit expansion and contraction and also so as to absorb vibrations.

A first outer pipe 58 encircles at least a portion of the length of the first inner pipe 53 and defines between these pipes a cooling jacket, indicated generally by the reference numeral 59. There are a plurality of ribs 50 that extend integrally between the inner pipe 53 and the outer pipe 58 so as to provide a unitary construction and permit water flow between the portions of the cooling jacket 59. A further elastic outer joint 61 encircles the remainder of the inner pipe 53, overlies the elastic joint 56 and is affixed to a flange portion 62 of an outer housing or jacket 63 of the second expansion chamber 51 by a hose clamp 64. As a result, the cooling jacket 59 encircles the elastic joint 56. The other end of the outer joint 61 is held in place by a clamp 60.

It should be noted that the megaphone tube 54 is also formed with an outer portion 65 so as to form an extension of this cooling jacket into the expansion chamber 51.

The second expansion chamber 51 has a vertically extending pipe portion 66 formed at its outer end which communicates with a cooling jacket 67 that encircles the expansion chamber 51 and which is formed by the outer housing 63. An exhaust outlet pipe nipple 68 is formed in this outer housing 63 and has slipped over it a flexible conduit 69 which delivers the exhaust gases to a still further expansion chamber and watertrap device 71. This device 71 then discharges the exhaust gases through a conduit 72 to the tunnel 19 around the jet propulsion unit 18 for discharge into the body of water in which the watercraft is operating.

It should be noted that coolant from the engine may also be discharged into the exhaust manifold 43 in a suitable manner so as to provide additional cooling and silencing.

Water is delivered to the cooling jacket 59 of the joint 52 by means of a conduit 73 that communicates with a portion of the engine cooling jacket 41. The conduit 73 communicates with the cylinder head of the engine 12 as shown in FIG. 2 and thus with an upper portion of its cooling jacket so as to permit air to be purged from the engine cooling jacket upon restarting after the engine has stopped and coolant with have drained from its cooling jacket. When the engine is running, this coolant will circulate around the joint 56 so as to cool it and then can enter into the megaphone section. In order to insure that the joint 56 is fully encircled by coolant even during times with the engine is running slow and a low amount of water is circulated, there is a wall formed by the megaphone section 54 which has a dam like effect and which wall is indicated generally by the reference number 74. This wall 74 has a pair of upwardly positioned apertures 75 at their upper peripheral edges so as to insure that the joint 56 will be encircled with cooling water at all times when the engine is running. This water can then flow through the apertures 75 to the jacket 67 so as to cool the second expansion chamber 51.

There is a still further dam formed around the discharged end of the expansion chamber 51 by means of a elastic gasket member 76 which elastic gasket member has a pair of openings 77 at its upper end so as to provide the same damming effect and trap water around the expansion chamber 51 even when the engine is running at slow speeds. As a result, it should be observed that all critical components of the exhaust system will be completely surrounded by water under all running conditions and this will insure good cooling particularly of the elastic joints.

It is, of course, desirable that the water will be drained from these cooling jackets when the engine is not running and the watercraft is taken out of the body of water in which it is operating. To this end, the gasket 76 is provided with a bleed opening 78 at its lower end which will let the water bleed out of this jacket and be discharged into the exhaust system through the nipple 68. In a like manner, the wall 74 is provided with a bleed port 79 which will permit the water to bleed out in this same direction.

Figure 5:
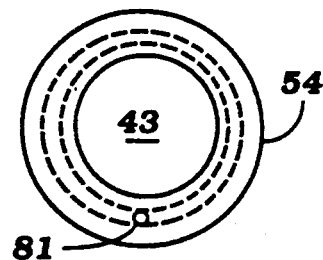
FIG. 5 is a cross sectional view taken along the line 5—5 of FIG. 3.
Figure 6:
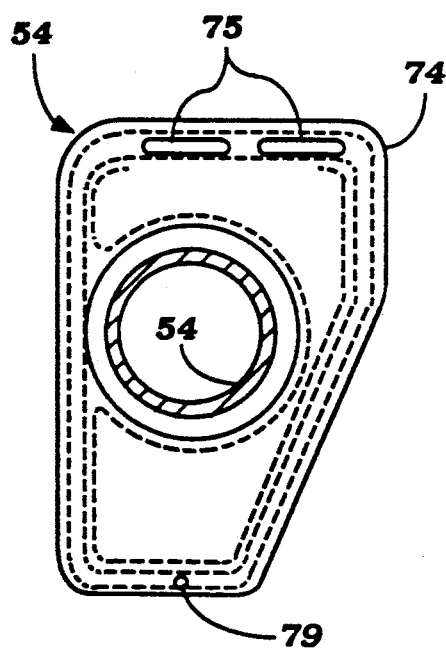
FIG. 6 is a cross sectional view taken along the line 6—6 of FIG. 3.
Figure 7:
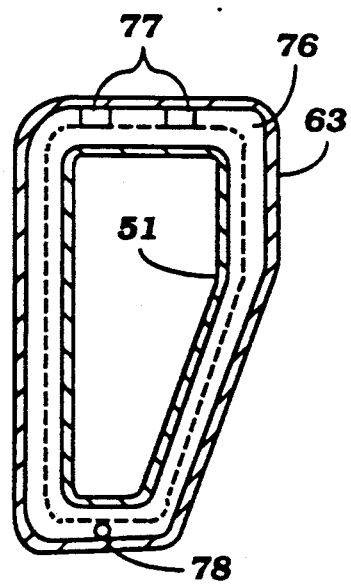
FIG. 7 is a cross sectional view taken along the line 7—7 of FIG. 3.

The gasket 54 (FIG. 5) between the joint 52 and the first expansion chamber 43 is also provided with a bleed port 81. In this way, when the engine is not running and the watercraft is out of the body of water in which it is operating, the cooling jacket 59 may drain through this bleed port 81 and the conduit 49 for discharge.

It should be readily apparent from the foregoing description that the described system provides a very effective exhaust system for a small watercraft and one in which the elastic joints are always well cooled and will, therefore, be protected from deterioration. Although an embodiment of the invention has been illustrated and described, various changes and modifications may be made without departing from the spirit and scope of the invention as defined by the appended claims.

We claim:

1. A cooling arrangement for exhaust pipe or the like of a marine propulsion engine cooled by water drawn by a coolant pump from the body of water in which a watercraft is operated and returned thereto, said exhaust pipe having a horizontally extending portion, a horizontally extending cooling jacket formed around said horizontally extending portion of said exhaust pipe, a coolant inlet port means connected to said coolant jacket for delivery of water thereto from the body of water by said coolant pump and a coolant outlet port means from said coolant jacket for returning water to the body of water, said coolant outlet port means being sized and positioned relative to said coolant inlet port means to insure the volume of said cooling jacket between said inlet port means and said outlet port means is filled with coolant under all conditions of operation of said coolant pump so as to insure adequate cooling of said exhaust pipe, said coolant outlet port means including a restricted opening at a lower portion of said cooling jacket to drain water from said cooling jacket when the engine is not running but small enough not to deplete the water level in said cooling jacket when said engine is running.

2. A cooling arrangement for an exhaust pipe or the like of a marine propulsion engine cooled by water drawn by a coolant pump from the body of water in which a watercraft is operated and returned thereto, said exhaust pipe having a horizontally extending portion, a horizontally extending cooling jacket formed around said horizontally extending portion of said exhaust pipe, a coolant inlet port means connected to said coolant jacket for delivery of water thereto from the body of water by said coolant pump and a coolant outlet port means from said coolant jacket for returning water to the body of water, said coolant outlet port means being sized and positioned relative to said coolant inlet port means to insure the volume of said cooling jacket between said inlet port means and said outlet port means is filled with coolant under all conditions of operation of said coolant pimp so as to insure adequate cooling of said exhaust pipe, said coolant inlet port means is at one end of the cooling jacket and the coolant outlet port means is formed by a wall at the other end of the cooling jacket, said wall being at least in part elastic for resiliently suspending said exhaust pipe horizontal portion within said cooling jacket.

3. A cooling arrangement for an exhaust pipe as set forth in claim 2 further including a drain opening at a lower portion of the cooling jacket for draining coolant from the cooling jacket when the engine is not running.

4. A cooling arrangement for an exhaust pipe as set forth in claim 3 wherein the drain opening forms one of the coolant outlet port means formed by the wall.

* * * * *